Nov. 24, 1936.        H. W. PLEISTER        2,061,634
SPRING TOGGLE BOLT
Filed Oct. 7, 1935
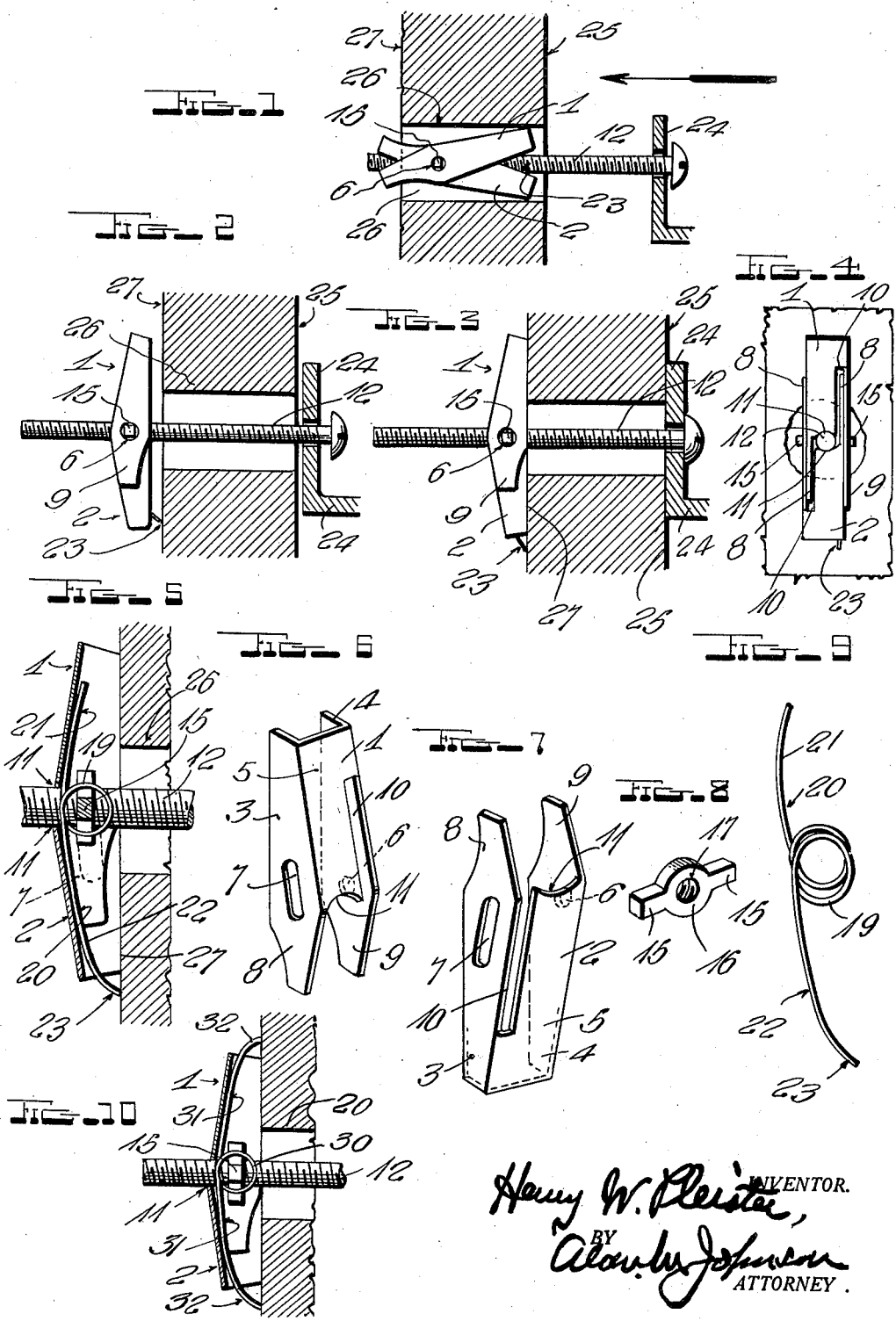

Patented Nov. 24, 1936

2,061,634

UNITED STATES PATENT OFFICE 2,061,634

SPRING TOGGLE BOLT

Henry W. Pleister, Westfield, N. J., assignor to Diamond Expansion Bolt Company, Inc., Garwood, N. J., a corporation of New Jersey Application October 7, 1935, Serial No. 43,991

11 Claims. (Cl. 85—3)

My invention relates to a new and improved spring toggle bolt to secure objects to walls, ceilings, or other supports, where it is impossible, or not feasible, to get behind the support to manually apply a nut, or other fastening member, to the bolt supporting the work.

My invention comprises a spring toggle bolt, provided with resilient means to engage with the concealed or inaccessible surface of a wall or similar support, to yieldingly retard or stop the rotation of the toggle head when the stove, or other bolt, is being screwed up to hold the work in place.

This greatly facilitates the application of the toggle bolt, saves time, and, when the head of a stove or other bolt is close to the work to be supported, it saves the finger nails and temper of the mechanic.

For purposes of illustration, I have shown my invention in connection with the spring toggle bolt patented to me September 3, 1935, Patent No. 2,013,503.

While my invention may be used with this form of spring toggle bolt, it is adapted for general application, and is not to be limited except as expressly set forth in my claims.

My invention further relates to certain combinations, sub-combinations, and articles of manufacture as will be more fully hereinafter described and pointed out in the claims.

In the accompanying drawing I have shown different illustrative embodiments of my invention, simply by way of example, though it is to be distinctly understood that my invention is not to be confined to these particular forms. In this drawing the same reference numerals refer to similar parts in the several figures.

Fig. 1 is a vertical section through a wall, and the work to be supported, showing my spring toggle bolt being inserted into a hole in the wall, the toggle head being in side elevation.

Fig. 2 is a vertical section, similar to Fig. 1, showing the toggle head expanded and the resilient means engaging with the concealed surface of the wall to yieldingly hold the head from rotation as the stove or other bolt is screwed home.

Fig. 3 is a vertical section, similar to Fig. 2, showing the stove bolt screwed home and the position of the resilient engaging stop when the wing anchors engage the inner surface of the wall.

Fig. 4 is a rear elevation.

Fig. 5 is a vertical section, on an enlarged scale, through Fig. 3.

Fig. 6 is a perspective view of one of the wing anchors.

Fig. 7 is a perspective view of the other cooperating wing anchor.

Fig. 8 is a perspective view of the trunnion nut on which the wing anchors are mounted.

Fig. 9 is a perspective view of the combined coil spring and resilient stop.

Fig. 10 is a vertical section of a spring toggle bolt provided with two (2) spring stops, formed by extending both arms of the coil spring so that the end of each arm becomes a resilient stop.

In practice it is more or less of a dexterous maneuver to position any spring toggle bolt.

It is necessary to prevent the toggle head from rotating on the concealed surface of the wall, as the stove or other bolt is screwed into it. While the stove bolt is being screwed home, the mechanic has to also hold the work in position, so that it will be true when the toggle wings are brought up firmly on the inside or concealed surface of the wall or other support.

To prevent the rotation of the toggle head, it is customary for the mechanic to draw back on the head of the stove bolt to exert frictional pressure or resistance between the toggle head and the inner surface of the wall. This friction must be greater than the friction of the male threads on the stove bolt and the female threads in the trunnion nut, as the bolt is screwed home.

When the head of the stove bolt is up close to the work to be supported, it is often necessary for the mechanic to get a very close hold of the head of the stove bolt, often by employing his finger nails, to their damage. At the same time, he has to hold the work in position and screw up the stove bolt. Therefore, it can be readily seen that it requires considerable skill and patience to position any spring toggle bolt.

By my invention, I avoid all this and save time in installing a spring toggle bolt.

In the simplest form of my invention, I extend one arm (or both) of the usual coil spring which actuates the wing anchors, a sufficient distance to form a resilient frictional stop to engage with the concealed inner surface of the wall to yieldingly hold the wing anchors from rotation as the stove bolt is screwed home. When locking or binding pressure is applied to the spring toggle bolt the yielding frictional stop is pressed out of the way and does not interfere with the spring toggle bolt exerting its maximum bond or grip with the inner surface of the wall.

I have illustrated, by way of example, my invention applied to the spring toggle bolt of my Patent 2,013,503.

In the drawing the wing anchors 1 and 2 are formed of sheet metal. The wing anchor 2 is provided with side arms 3 and 4 and a back 5. The side arm 4 is provided with a pivoting hole 6, and the side arm 3 is provided with a pivoting slot 7. The arm 3 is continued beyond the pivoting slot 7 to form an integral short arm 8. The side arm 4 is continued beyond the pivoting hole 6 to form a short integral side arm 9. The back 5 is cut to form a slot 10 and rounded at 11 to form a stop to engage with the stove bolt as described in my said patent.

The other wing anchor 1 is provided with similar numbers.

In assembling the two (2) wing anchors 1 and 2, the short arm 9 of the wing anchor 2 is received in the slot 10 of the wing anchor 1, while the short arm 8 of the wing anchor 1 is received in the slot 10 of the wing anchor 2, see Fig. 4. The short arm 8 of wing arm 2 and the short arm 9 of the wing arm 1 are located on the outside of the completed toggle head formed by the two (2) wing anchors 1 and 2, see Fig. 4.

The wing anchors 1 and 2 are mounted on the trunnions 15, 15 of the trunnion nut 16 by means of their pivoting slots 7, 7 and pivoting holes 6, 6. This trunnion nut is provided with female threads 17 to cooperate with the male threads on the stove or other bolt 12.

On one of the trunnions I mount resilient means, as the coil 19 of the coil spring 20. This spring has two arms 21 and 22. The arm 21, in the preferred construction illustrated in Figs. 1–9 inclusive, simply lies in the channel formed in the wing anchor. The other arm 22, in this form of my invention, is extended to form a bent resilient stop, projecting a short distance beyond the bearing surface of the toggle head. In practice I have found excellent results by having the resilient stop 23 extend about $\frac{3}{16}''$ (three-sixteenths of an inch). Of course this distance may be varied as found convenient or desirable.

In use the stove or other bolt is first inserted through a hole in the work 24 to be supported on the surface of the wall 25, see Fig. 1. The stove or other bolt, is then screwed into the trunnion nut 16, and the wing anchors 1 and 2 compressed as shown in Fig. 1.

As soon as the ends of the wing anchors escape from the hole 26, the spring 20 will cause the wing anchors 1 and 2 to fly apart, Fig. 2.

The resilient stop 23, Fig. 2, will engage at once with the inner surface 27 of the wall 25 and exert a yielding pressure or resistance on said wall, while the mechanic screws home the stove or other bolt 12, without any of the disadvantages previously set forth in full herein. In some cases it may be necessary to exert pressure on the bolt to cause the stop 23 to engage with the inner surface of the wall. The moment this engagement takes place sufficient resistance results to prevent or retard the rotation of the toggle head as the bolt is screwed into the nut.

In Fig. 10 I have illustrated a modification in which the resilient spring 30 has both its arms 31, 31 extended to form two resilient stops 32, 32.

It will be noted that as the stove bolt begins to exert binding action on the toggle head formed by the two wing anchors 1 and 2, the resilient stop 23, Fig. 3 and Fig. 5 yields or bends and does not interfere with, or diminish the area of contact between the toggle head and the inner surface of the wall.

This is equally true of the modification illustrated in Fig. 10.

Having thus described this invention in connection with illustrative embodiments thereof, to the details of which I do not desire to be limited, what is claimed as new and what is desired to secure by Letters Patent is set forth in the appended claims.

What I claim is:

1. In a spring toggle bolt, the combination of a toggle head, and resilient means adapted to first engage with the inner surface or other support, to exert sufficient friction on the said wall to prevent or retard rotation of the toggle head as the bolt is screwed into it, said resilient means being adapted to be forced into an inoperative position as the toggle head is screwed home.

2. In a spring toggle bolt, the combination of a toggle head formed of pivoted members, resilient means to force the pivoted members apart, and resilient means separate from the pivoted members of the toggle head to engage with the inner surface of the wall to retard or prevent the rotation of the toggle head as the bolt is screwed into it.

3. In a spring toggle bolt, the combination of a toggle head formed of pivoted members, resilient means separate from the pivoted members of the toggle head to force the pivoted members apart, said resilient means being provided with a stop to retard the rotation of the toggle head when a bolt is screwed into it.

4. In a spring toggle bolt, the combination of a toggle head formed of pivoted members, resilient means separate from the pivoted members of the toggle head to force the pivoted members apart, said resilient means being provided with a resilient stop to retard the rotation of the toggle head when a bolt is screwed into it.

5. In a spring toggle bolt, the combination of a toggle head, including pivoted members, a spring to force the members apart, and a stop carried by the spring adapted to engage with the inner surface of a wall to prevent or retard the rotation of the toggle head when a bolt is screwed into the head.

6. In a spring toggle bolt, the combination of a toggle head, including pivoted members, a spring to force the members apart, and an integral stop carried by the spring adapted to engage with the inner surface of a wall to prevent or retard the rotation of the toggle head when a bolt is screwed into the head.

7. In a spring toggle bolt, the combination of a toggle head, formed of two pivoted wings, a nut on which the wings are pivoted, a bolt, a spring carried by the nut adapted to force the wings apart into the operative position, and a stop carried by the spring adapted to engage with the inner surface of the wall or other support to retard or prevent the nut rotating as the bolt is screwed into it.

8. In a spring toggle bolt, the combination of a toggle head, formed of two pivoted wings, a nut on which the wings are pivoted, a bolt, and resilient means adapted to both spread the pivoted wings and form a resilient stop to engage with the inner surface of a wall or other support, to prevent or retard rotation of the nut when a bolt is screwed into it.

9. In a spring toggle bolt, the combination of a toggle head, formed of two pivoted wings, a nut on which the wings are mounted, a bolt, a coil spring mounted on the nut and having arms adapted to spread the pivoted wings, one of the arms being extended to form a resilient stop to engage with the inner surface of a wall or other support, and prevent or retard the rotation of the nut as the bolt is screwed into it.

10. In a spring toggle bolt, the combination of a toggle head adapted to engage directly with the inner surface of a wall or other support, resilient means carried by the toggle head and separate from it, to first engage with the concealed inner surface of a wall to retard or prevent rotation of the toggle head, as the bolt is screwed into it, and a bolt.

11. In a spring toggle bolt, the combination of a toggle head including pivoted wings, resilient means carried by the toggle head, adapted to engage with a concealed surface of the wall or other support in advance of the wings of the toggle head, to retard or prevent rotation of said wings, said resilient means being adapted to be forced out of the arcuate path of the engaging wings when the toggle head is screwed home, and a bolt.

HENRY W. PLEISTER.